US011178511B2

(12) United States Patent
Gao et al.

(10) Patent No.: US 11,178,511 B2
(45) Date of Patent: Nov. 16, 2021

(54) METHOD AND DEVICE FOR POSITIONING COMMUNICATION DEVICE

(71) Applicant: NOKIA TECHNOLOGIES OY, Espoo (FI)

(72) Inventors: Fei Gao, Shanghai (CN); Jinxing Lu, Shanghai (CN); Chaojun Xu, Shanghai (CN); Gang Shen, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/763,260

(22) PCT Filed: Nov. 17, 2017

(86) PCT No.: PCT/CN2017/111722
§ 371 (c)(1),
(2) Date: May 12, 2020

(87) PCT Pub. No.: WO2019/095308
PCT Pub. Date: May 23, 2019

(65) Prior Publication Data
US 2020/0314594 A1  Oct. 1, 2020

(51) Int. Cl.
*H04W 4/02* (2018.01)
*H04B 17/27* (2015.01)
(Continued)

(52) U.S. Cl.
CPC .......... *H04W 4/026* (2013.01); *H04B 7/0814* (2013.01); *H04B 17/27* (2015.01); *H04B 17/318* (2015.01)

(58) Field of Classification Search
CPC ..... H04W 4/026; H04B 17/27; H04B 17/318; H04B 7/0814
(Continued)

(56) References Cited

U.S. PATENT DOCUMENTS 6,330,459 B1 * 12/2001 Crichton ............... H04W 16/28
455/434
8,195,098 B2 *  6/2012 Wang ................... H04B 7/0491
455/67.14
(Continued)

FOREIGN PATENT DOCUMENTS

CN      102480329 A    5/2012
CN      103079268 A    5/2013
(Continued)

OTHER PUBLICATIONS

International Search Report and Written Opinion dated Aug. 8, 2018 corresponding to International Patent Application No. PCT/CN2017/111722.

(Continued)

*Primary Examiner* — Nghi H Ly
(74) *Attorney, Agent, or Firm* — Squire Patton Boggs (US) LLP

(57) ABSTRACT

Embodiments of the disclosure provide a method and device for positioning a communication device. According to embodiments of the present disclosure, the communication device may determine, without phase information of the signals, a direction of other communication device based on an association between strength levels of signals received from the other communication device and angles at which the signals are received for better accuracy. According to embodiments of the present disclosure, the communication device may determine the direction of the other communication device without phase information of the received signals based on MUSIC algorithm. According to the embodiments of the present disclosure, the method may also be implemented in a multipath scenario.

11 Claims, 6 Drawing Sheets

(51) Int. Cl.
*H04B 17/318* (2015.01)
*H04B 7/08* (2006.01)

(58) Field of Classification Search
USPC .... 455/456.1, 456.3, 404.2, 421, 422.1, 418
See application file for complete search history.

(56) References Cited

U.S. PATENT DOCUMENTS

| | | | |
|---|---|---|---|
| 9,322,898 | B2 | 4/2016 | Kim et al. |
| 9,568,582 | B2 * | 2/2017 | Chang ................... H04B 17/27 |
| 10,694,304 | B2 * | 6/2020 | Maziewski .......... H04R 29/005 |
| 2009/0054106 | A1 | 2/2009 | Antolovic et al. |
| 2010/0167675 | A1 | 7/2010 | Zhao |
| 2012/0238288 | A1 * | 9/2012 | Donaldson ........... H01Q 3/2611 455/456.1 |
| 2018/0088201 | A1 * | 3/2018 | Fujio ......................... G01S 3/32 |

FOREIGN PATENT DOCUMENTS

| | | |
|---|---|---|
| CN | 103488188 A | 1/2014 |
| CN | 104967493 A | 10/2015 |
| CN | 105025571 A | 11/2015 |
| CN | 105848261 A | 8/2016 |
| GB | 2459479 A | 10/2009 |
| WO | WO 2015/027118 A1 | 2/2015 |

OTHER PUBLICATIONS

Extended European Search Report corresponding to EP Application No. 17932190.6, dated May 17, 2021.
Marco Passafiume et al., "On the duality of Phase-based and Phase-less RSSI Music algorithm for Direction of Arrival estimation", Nov. 22, 2014, XP055801942, 7 pages.
Indian Office Action corresponding to IN Application No. 202047023674, dated Apr. 6, 2021.
Chinese Office Action corresponding to CN Application No. 201780096928.6, dated Aug. 25, 2021.

* cited by examiner

METHOD AND DEVICE FOR POSITIONING COMMUNICATION DEVICE

FIELD

Embodiments of the present disclosure generally relate to communication techniques, and more particularly, to a method and a device for positioning a communication device.

BACKGROUND OF THE INVENTION

With the development of communication technologies, the traffic of communication also greatly increases. In response to the growing business of communication, the 3rd Generation Partnership Project (3GPP) has proposed new mobile communication standards, for example, the fifth generation (5G) mobile communication standard. In the 5G communication systems, the positioning of communication devices, in particular the positioning of indoor communication devices has attracted widespread attention. Nowadays, some 5G programs include indoor navigation, high-precision positioning, and human motion sensing such as heart rate. Further research is needed on the positioning of communication devices in the 5G communication systems to improve the accuracy of measurements.

SUMMARY OF THE INVENTION

Generally, embodiments of the present disclosure relate to a method for positioning a communication device and the corresponding communication device In a first aspect, embodiments of the present disclosure provide a method. The method comprises: receiving a plurality of signals from a second communication device by an antenna of the first communication device, at a plurality of angles, the antenna being switched to the plurality of angles in sequence; determining an association between strength levels of the plurality of signals and the plurality of angles; and determining a direction of the second communication device relative to the first communication device based on the association without phase information of the plurality of signals.

In a second aspect, embodiments of the disclosure provide a communication device. The network device comprises: at least one controller; and a memory coupled to the at least one processor, the memory storing instructions therein, the instructions, when executed by at least one processor, causing the network device to perform acts including: receiving a plurality of signals from a second communication device by an antenna of the first communication device, at a plurality of angles, the antenna being switched to the plurality of angles in sequence; determining an association between strength levels of the plurality of signals and the plurality of angles; and determining a direction of the second communication device relative to the first communication device based on the association without phase information of the plurality of signals.

In a third aspect, embodiments of the disclosure provide a computer readable medium. The computer readable medium stores instructions thereon, the instructions, when executed by at least one processing unit of a machine, causing the machine to implement: receiving a plurality of signals from a second communication device by an antenna of the first communication device, at a plurality of angles, the antenna being switched to the plurality of angles in sequence; determining an association between strength levels of the plurality of signals and the plurality of angles; and determining a direction of the second communication device relative to the first communication device based on the association without phase information of the plurality of signals.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the figures, the same or similar reference numbers indicate the same or similar elements.

DETAILED DESCRIPTION OF EMBODIMENTS

Figure 1:
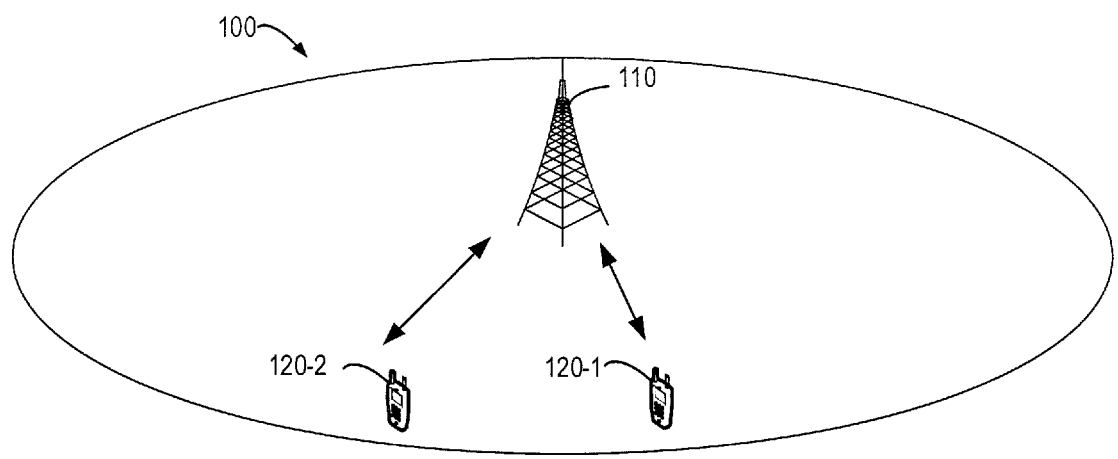
FIG. 1 illustrates a schematic diagram of a communication system according to embodiments of the present disclosure.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied to various communication systems. Given the rapid development in communications, there will of course also be future communication technologies and systems with which the present disclosure may be embodied. It should not be seen as limiting the scope of the present disclosure to only the aforementioned system.

The term "communication device" refers a network device which includes, but not limited to, a base station (BS), a gateway, a management entity, and other suitable device in a communication system. The term "base station" or "BS" represents a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "communication device" may also refer to a terminal device which includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

FIG. 1 illustrates a schematic diagram of an environment in which embodiments of the present disclosure can be implemented. The environment 100, which is a part of a communication network, includes a network device 110 and one or more terminal device 120-1, 120-2, . . . , 120-N (collectively referred to as "terminal devices" 120). It should be noted that the environment 100 may also include other elements which are omitted for the purpose of clarity. The network device 110 communicates with the terminal devices 120. It is to be understood that the number of network devices and terminal devices shown in FIG. 1 is given for the purpose of illustration without suggesting any limitations. The network 100 may include any suitable number of network devices and terminal devices.

Communications in environment 100 may be implemented according to any proper communication protocol(s), including, but not limited to, cellular communication protocols of the first generation (1G), the second generation (2G), the third generation (3G), the fourth generation (4G) and the fifth generation (5G) and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, including but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

As described above, further research is needed on the positioning communication devices in a 5G communication system. In general, positioning with ultra-wideband (UWB) technology can be accurate to the centimeter level. However, because communication devices, such as wireless fidelity (Wi-Fi) devices, have limited bandwidth (for example, 20 MHz), the positioning of such communication devices can only be accurate to the meter level. In the presence of multipath, the accuracy of positioning of such communications equipment may be only 15 meters. Therefore, the accuracy of positioning communication needs to be improved.

The synthetic-aperture radar (SAR) has been used to improve the accuracy of positioning communication. However, the conventional synthetic-aperture radar technology-inspired communication platform positioning method has a problem of introducing phase errors in signal processing.

Figure 2:
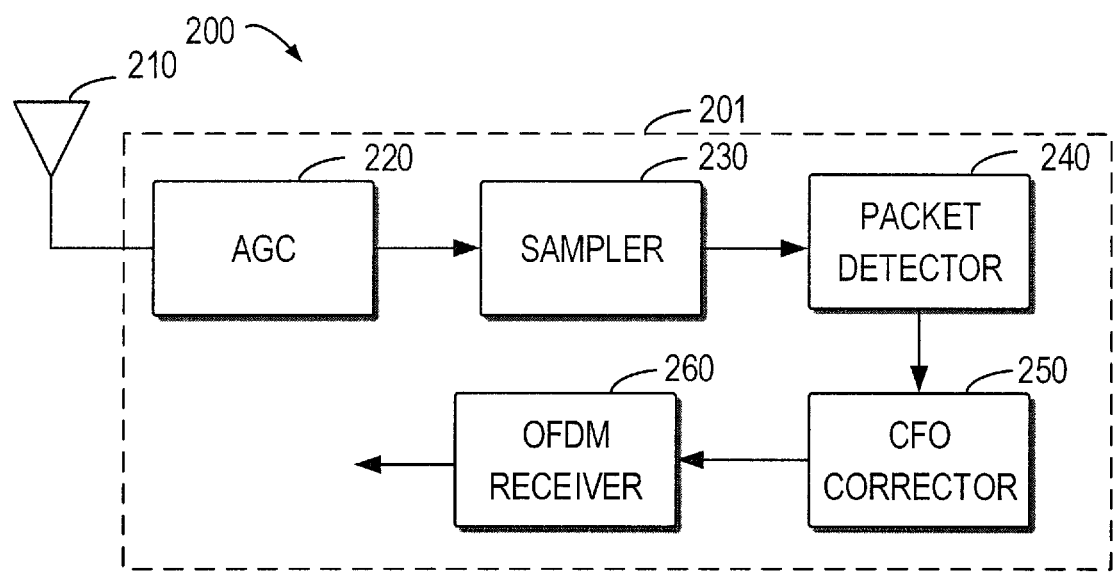
FIG. 2 illustrates a block diagram of a signal processing of the conventional communication system.

FIG. 2 shows an example block diagram of a conventional signal processing system 200. The signal processing system 200 may include an antenna 210 and a digital signal processing section 201. The digital signal processing section 201 may include an automatic gain controller (AGC) 220, a sampler 230, a data packet detector 240, a center frequency compensation (CFO) corrector 250 and an orthogonal frequency division multiplexing (OFDM) receiver 260. During processing of signals received by the antenna 210, the digital signal processing section 201 may introduce phase errors. For example, the sampler 230 may produce phase errors during sampling. Similarly, the packet detector 240, the CFO corrector 250, and the OFDM receiver 260 may also introduce phase errors.

The fingerprinting technology has been used to position communication devices. However, because the Fingerprinting technology needs to pre-store some information related to environment, if the environment changes a lot, the fingerprinting technology is not able to position the communication devices accurately.

As described above, the conventional method for positioning the communication devices needs phase information of the received signals. The inventors found that the phase information is difficult to determine. In some situations, the phase information cannot even be detected. Unlike the phase information, strength of the received signals can be determined accurately. Therefore, there is a need to take advantage of the strength information of the received signals to improve the accuracy of positioning the communication devices.

Figure 3:
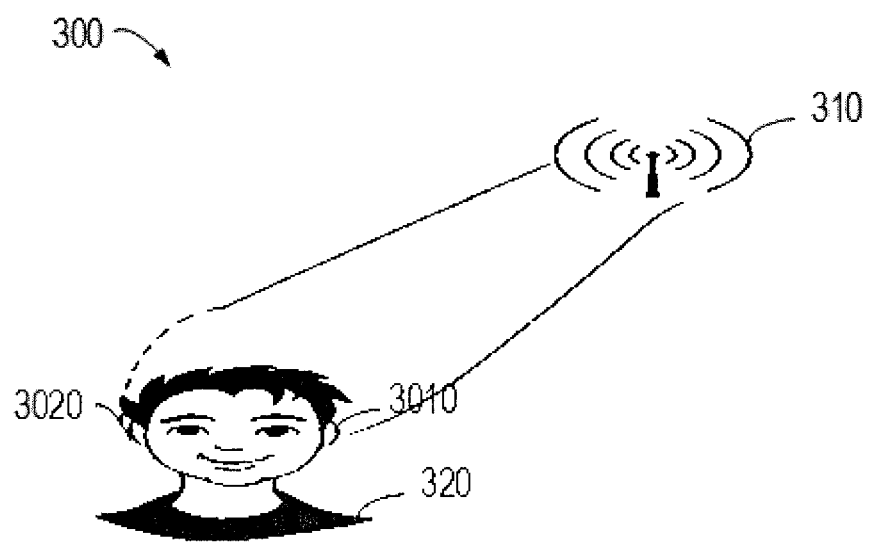
FIG. 3 illustrates a schematic diagram of a system of positioning a sound source by a human.

The inventors are inspired by positioning a sound source by the human being. FIG. 3 illustrates a schematic diagram of a system 300 of positioning a sound source 310 by the human. 320. Generally, for most of audible frequency range (20 Hz-20 kHz), human ears are able to estimate sound source with up to 1° accuracy. For higher frequency (above 3 kHz), the head performs like a low-pass filter, which means one ear receive signals without the influence of the head while the other ear receives the signals after the low-pass filter. As shown in FIG. 3, signals from the sound resource 310 arrive at right ear 3010 and left ear 3020, respectively. The signals at right ear 3010 and the signals at left ear 3020 are different in phases and amplitudes. The human 320 is able to position the sound source 310 accurately with the combination of phases and amplitudes information.

Figure 4:
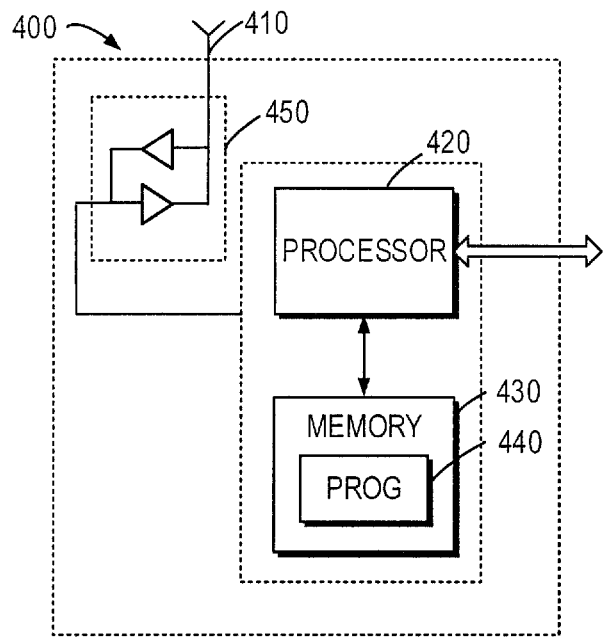
FIG. 4 illustrates a communication device according to embodiments of the present disclosure.

FIG. 4 illustrates a communication device 400 according to embodiments of the present disclosure. As shown in FIG. 4, the communication device 400 includes one or more processors 420, one or more memories 430 coupled to the processor(s) 420, one or more transmitters and/or receivers (TX/RX) 450. The TX/RX 450 includes an antenna 410. The communication device 400 may be implemented as the network device 110. The communication device may also be implemented as the terminal device 120. Only for the purpose of illustration, the network device 110 is regarded as the first communication device and the terminal device 120 is regarded as the second communication device. It should be appreciated that both the network device 110 and the terminal device 120 can be regarded as the first communication device as well as the second communication device.

The network device 110 receives signals from the terminal device 120 via the antenna 410 at different angles to determine a direction of the terminal device 120 relative to the network device 110, without using the phase information of the received signals, so as to improve the accuracy of positioning the terminal device 120.

In particular, the network device 110 receives signals from the terminal device 120 via the antenna 410. Since the antenna 410 is switched to different angles, the network device 110 receives signals at different angles. The network device 110 determines the direction of the terminal device 120 based on relation between strength of the received signals and the angels. The strength of the received signals and the angles are more accurate compared with the phase information of the received signals, the network device 110 determines the direction of the terminal device 120 with higher precision.

Figure 5:
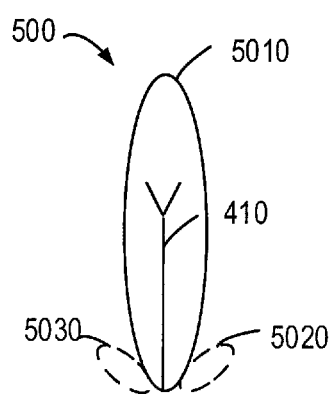
FIG. 5 illustrates a radiation pattern of an antenna according to embodiments of the present disclosure.

FIG. 5 shows a radiation pattern 500 of the antenna 410 according to embodiments of the present disclosure. By way of example, the antenna 410 herein refers to a directional antenna and the radiation pattern 500 is an example radiation pattern of a directional antenna.

As shown in FIG. 5, the radiation pattern 500 may include a main lobe 5010 (also known as "beam") and side lobes 5020, 5030. The antenna 410 has the maximum gain at the direction of the main lobe 5010. For example, if a signal propagates along the direction of the main lobe 5010, the antenna 410 detects greater power of the signal. If the signal propagates along the direction of a side lobe (for example, the side lobe 5020), the antenna 410 detects smaller power of the signal. That is to say, even though the signal has the same power, the power of the signal detected by the antenna 410 depends on the propagation direction of the signal, in other words, the direction of the signal relative to the antenna 410.

Figure 6:
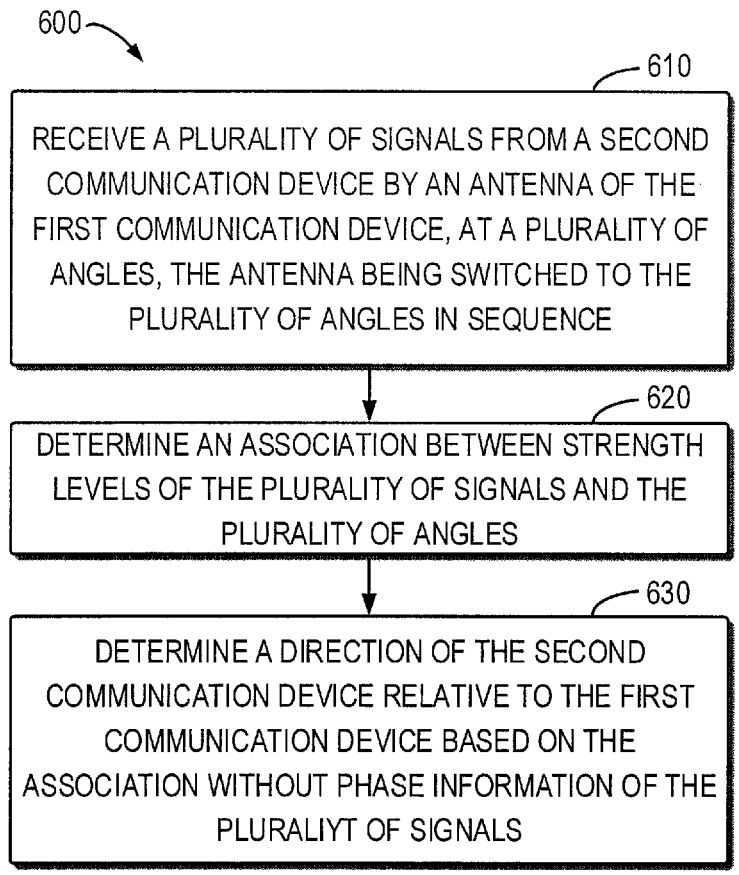
FIG. 6 illustrates a flow chart of a method for positioning a communication device according to embodiments of the present disclosure.
Figure 7:
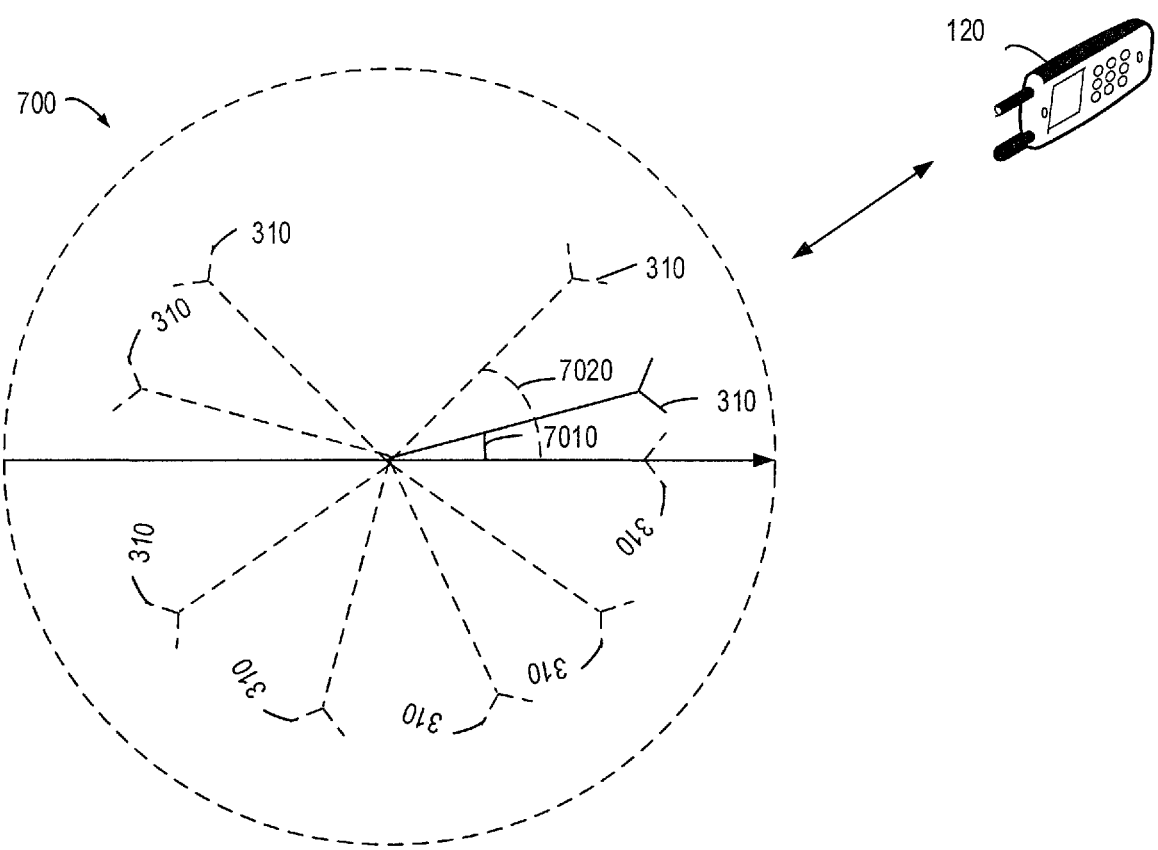
FIG. 7 illustrates a schematic diagram of a communication system according to embodiments of the present disclosure.

Now some example embodiments of the present disclosure are described with reference to FIGS. 6 and 7. FIG. 6 illustrates a flow chart of a method 600 for positioning a communication device according to embodiments of the present disclosure. The method 600 may be implemented at the network device 110 or at the terminal device 120. Only for the purpose of illustration, the following description describes that the method 400 is implemented at the network device 110. FIG. 7 illustrates a schematic diagram of a communication system 700 according to embodiments of the present disclosure.

At block 610, the network device 110 receives a plurality of signals from the terminal device 120 by the antenna 410 of the network device 110, at a plurality of angles. The antenna 410 is switched to the plurality of angles in sequence. As shown in FIG. 7, by way of example, the antenna 410 is rotated on an azimuth plane R and the initial direction of the antenna 410 may be regarded as the horizontal direction X which means the initial angle is zero. In this example, the plurality of angles are angles relative to the horizontal direction X in anti-clock wise, for example. It is to be understood that the horizontal direction may be determined in any suitable ways. In an example embodiment, the plurality of angles may include the initial angle (0°) and the angle of 360°.

In some embodiments, if a duration in which the network device 110 receives the signals at a first angle exceeds a predetermined time threshold, the network device 110 switches the antenna 410 to a second angle to continue receiving the signals. For example, as shown in FIG. 6, the network device 110 receives the signals by the antenna 410 at the angle 7010 which means the antenna 410 is at the angle 7010. After a period of time, the network device 110 receives the signals at the angle 7020 by switching the antenna 410 to the angle 7020. The predetermined time threshold may be determined in any suitable methods. For example, if the terminal device 120 moves quickly, the period of time may be very short in order to reduce errors. In other embodiment, if the terminal device 120 moves relatively slow or is static, the period of time may be longer.

In an example embodiment, the gap between any two adjacent angles in the plurality angles is identical. By way of example, the plurality of angles include 0°, 30°, 60°, 90°, 120°, 150°, 180°, 210°, 240°, 270°, 300°, 330° and 360°, and the gap between two adjacent angels is 30°. It is to be understood that the plurality of angles may include any suitable number of angles. The number of the plurality of angles relates to the accuracy of measurements. In an example embodiment, the accuracy of measurements is improved if the plurality of angles includes more angles. It is to be understood that if the 3 dB beamwidth of the antenna 410 is narrower and the number of the plurality of angles are larger, the accuracy of measurements is further improved.

In other embodiment, the gap between two adjacent angles may not be identical. For example, if the network device 110 may predetermine that the terminal device 120 is at the direction of 30° to 90°, the network device 110 may increase the number of the angles between 30° and 90°. In this example, the plurality of angles include 0°, 30°, 40°, 50°, 60°, 70°, 80°, 90°, 150°, 210°, 270°, 330° and 360°. It is to be understood that the plurality of angles may include any other suitable values of angles.

At block 620, the network device 110 determines an association between strength levels of the plurality of signals and the plurality of angles. In an example embodiment, the network device 110 may use received signal strength indicator (RSSI) to determine the strength levels of the received signals. In this way, the network device 110 determines the power of the received signals in high precision and the accuracy of positioning the terminal device 120 can be improved. In other embodiment, the network device 110 may determine amplitude of the signal received at an angle and obtain the corresponding relationship between the amplitude and the angle.

At block 630, the network device 110 determines a direction of the terminal communication 120 relative to the network device 110 based on the association. In some embodiments, the network device 110 may determine the direction of the terminal device 120 by dividing the received signals into signal subspace and noise subspace. For example, the network device 110 may determine the direction of the terminal device 120 with multiple signal classification ("MUSIC") algorithm. As described above, at block 620, the network device 110 determines the association between the strengths levels of the plurality of signals and the plurality of angles. That is to say, the network device 110 obtains the relationship between the strength of the signals and the corresponding angels which can be regard as the steering vector of phased array in MUSIC algorithm. In other embodiment, the network device 110 may determine the direction of the terminal device 120 with estimation of signal parameters via rotational invariance technique (ES-PRIT).

In this way, the network device 110 determines the direction of the terminal device 120 based on the strength of the received signals and does not rely on the phase information of the received signals. As described above, the phase information may not be obtained accurately and sometimes it is even not possible to obtain the phase information. Therefore, compared with the conventional methods, embodiments of the present disclosure improve the accuracy of measurements by not relying on the phase information.

In an example embodiment, the network device 110 may determine an angle at which a signal with a maximum strength level in the plurality of signals is received based on the association. The network device 110 may determine the direction based on the determined angle. As explained above, the antenna 410 may detect maximum power of a signal if the signal from the terminal device 120 propagates along the direction of the main lobe 5010. In other words, the direction of the main lobe 5010 which detect maximum power of the signal is the direction of the terminal device 120. In some embodiments, the network device 110 may determine the direction of the terminal device 120 based on the association in multipath scenario.

Figure 8A:
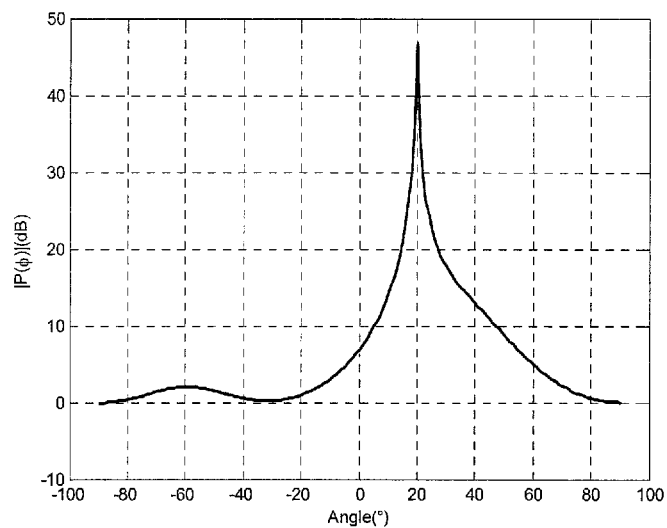
FIGS. 8A and 8B illustrate a schematic diagram of simulation results according to embodiments of the present disclosure.
Figure 8B:
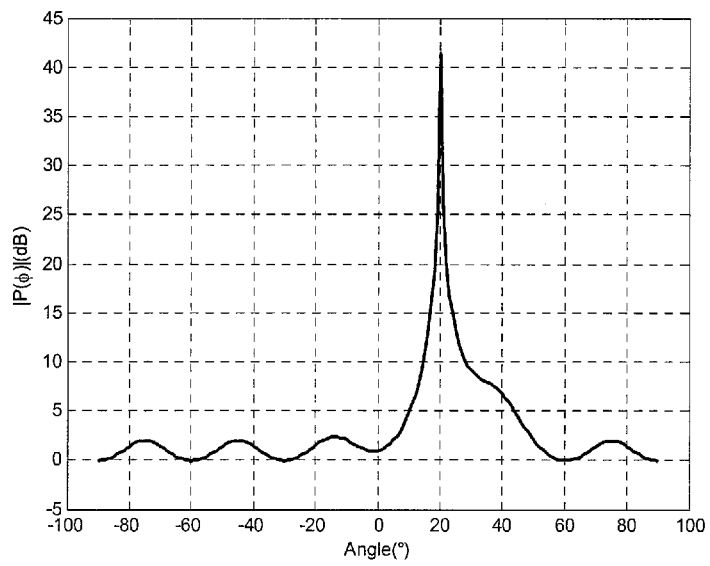

FIGS. 8A and 8B illustrate the simulation results according to embodiments of the present disclosure. For the simulation results shown in FIG. 8A, it simulates that the network device 110 receives the signals at six different angles and the 3 dB beamwidth of the antenna 410 is 60°. For the simulation results shown in FIG. 8B, it simulates that the network device 110 receives the signals at twelve different angles and the 3 dB beamwidth of the antenna 410 is 33°. It can be seen that both the simulation results shows that the terminal device 120 is at the direction of 20° relative to the network device 110. The simulation results in FIG. 8B are more accurate than the simulation results in FIG. 8A because the antenna in FIG. 8B has narrower 3 dB beamwidth and the number of the beams in FIG. 8B is larger.

It should be appreciated that embodiments of the present disclosure may be implemented by computer software executed by the processor 420 of the communication device 400, either by hardware or by a combination of software and hardware. As described above, the communication device 400 includes one or more processors 420, one or more memories 430 coupled to the processor 420, one or more transmitters and/or receivers 450 coupled to the processor 420.

The processor 420 may be of any type suitable to the local technical network, and may include one or more of general purpose computers, special purpose computers, microprocessors, digital signal processors (DSPs) and processors based on multicore processor architecture, as non-limiting examples. The communication device 400 may have multiple processors, such as an application specific integrated circuit chip that is slaved in time to a clock which synchronizes the main processor.

The memory 430 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 430 stores at least a part of a program 440. The TX/RX 450 is for bidirectional communications. The TX/RX 450 has at least one antenna to facilitate communication, though in practice an Access Node mentioned in this application may have several ones. The communication interface may represent any interface that is necessary for communication with other network elements.

The program 440 is assumed to include program instructions that, when executed by the associated processor 420, enable the communication device 400 to operate in accordance with embodiments of the present disclosure, as discussed herein with reference to FIGS. 6 and 7. That is, embodiments of the present disclosure can be implemented by computer software executable by the processor 420 of the communication device 300, or by hardware, or by a combination of software and hardware.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method comprising:
   receiving by an antenna of a first communication device a plurality of signals from a second communication device, at a plurality of angles, the antenna being switched to the plurality of angles in sequence;
   determining an association between strength levels of the plurality of signals and the plurality of angles; and
   determining a direction of the second communication device relative to the first communication device based on the association without phase information of the plurality of signals, wherein the plurality of angles comprises a first angle and a second angle, and wherein receiving the plurality of signals comprises:
   in response to a duration, in which the plurality of signals are received at the first angle, exceeding a predetermined time threshold, switching the antenna to the second angle to continue receiving the plurality of signals.

2. The method of claim 1, wherein determining the association comprises:
   determining the association between amplitudes of the plurality of signals and the plurality of angles.

3. The method of claim 1, wherein determining the direction comprises:
   determining, based on the association, the direction with a multiple signal classification (MUSIC) algorithm.

4. The method of claim 1, wherein a gap between any two adjacent angles in the plurality of angles is identical.

5. The method of claim 1, wherein the plurality of angles form a perigon.

6. A computer program embodied on a non-transitory computer readable medium, said computer program comprising encoded instructions which, when executed by at least one processing unit of a machine, cause the machine to perform;
   receiving, by an antenna of a first communication device, a plurality of signals from a second communication device, at a plurality of angles, the antenna being switched to the plurality of angles in sequence;
   determining an association between strength levels of the plurality of signals and the plurality of angles; and
   determining a direction of the second communication device relative to the first communication device based on the association without phase information of the plurality of signals, wherein the plurality of angles comprises a first angle and a second angle, and wherein receiving the plurality of signals comprises:
   in response to a duration, in which the plurality of signals are received at the first angle, exceeding a predetermined time threshold, switching the antenna to the second angle to continue receiving the plurality of signals.

7. A communication device, comprising:
   at least one processor; and
   a memory coupled to the at least one processor, the memory storing instructions therein, the instructions, when executed by the at least one processor, causing the communication device to perform:
   receiving, by an antenna of the communication device, a plurality of signals from a second communication device, at a plurality of angles, the antenna being switched to the plurality of angles in sequence;
   determining an association between strength levels of the plurality of signals and the plurality of angles; and
   determining a direction of the second communication device relative to the communication device based on the association without phase information of the plurality of signals, wherein the plurality of angles comprises a first angle and a second angle, and receiving the plurality of signals comprises:
   in response to a duration, in which the plurality of signals are received at the first angle, exceeding a predetermined time threshold, switching the antenna to the second angle to continue receiving the plurality of signals.

8. The communication device of claim 7, wherein determining the association comprises:
   determining the association between amplitudes of the plurality of signals and the plurality of angles.

9. The communication device of claim 7, wherein determining the direction comprises:
   determining, based on the association, the direction with a multiple signal classification (MUSIC) algorithm.

10. The communication device of claim 7, wherein a gap between any two adjacent angles in the plurality of angles is identical.

11. The communication device of claim 7, wherein the plurality of angles form a perigon.

* * * * *